United States Patent [19]

Darley et al.

[11] 4,423,078

[45] Dec. 27, 1983

[54] PRODUCTION OF ORIENTAL-STYLE BREADING CRUMBS

[75] Inventors: Kenneth S. Darley, Whitby; David V. Dyson, Richmond Hill; David J. Grimshaw, Thornhill, all of Canada

[73] Assignee: The Griffith Laboratories, Limited, Scarborough, Canada

[21] Appl. No.: 368,165

[22] Filed: Apr. 14, 1982

[51] Int. Cl.³ .................... A21D 2/00; A21D 8/04; A21D 2/08

[52] U.S. Cl. ................................ 426/20; 426/24; 426/549; 426/551; 426/516; 426/517; 426/518

[58] Field of Search ............... 426/19, 549, 498, 518, 426/20, 24, 551, 516, 517

[56] References Cited

U.S. PATENT DOCUMENTS 3,870,806  3/1975  Capossela et al. ............... 426/465
4,218,480  8/1980  Dyson et al. ...................... 426/19
4,364,961 12/1982  Darley et al. ..................... 426/19

Primary Examiner—David M. Naff
Assistant Examiner—Marianne S. Minnick
Attorney, Agent, or Firm—Sim & McBurney

[57] ABSTRACT

Oriental-style breading crumbs, useful for application to a variety of fried food products, are formed by a novel procedure in which a leavened dough is first formed by a continuous mixing process, the dough is stretched to elongate the pores in the dough, the stretched dough is baked while maintained in an elongated condition, and the baked dough is comminuted to form the crumbs. The Oriental-style breading crumbs which are formed by this procedure may have less fragility and a more uniform size and splinter shape and impart greater crispiness to food products than crumbs produced by prior art procedures.

30 Claims, No Drawings

PRODUCTION OF ORIENTAL-STYLE BREADING CRUMBS

FIELD OF INVENTION

The present invention relates to the production of oriental-style breading crumbs.

BACKGROUND TO THE INVENTION

Oriental-style breading crumbs, also referred to as Japanese-style breading crumbs and Panko-style breading crumbs, are characterized by an elongate shape having a coarse, splintered appearance. These breading crumbs are used to provide a tender texture and crispiness to a variety of fried food products, such as, seafoods, poultry and red meat, which is considered desirable.

These breading crumbs conventionally are formed by a procedure which involves a conventional proofed dough preparation followed by rapid baking using the electrical resistance of the dough as a means of heating. Bread flour, optionally in admixture with rice flour, is combined with water, salt and yeast, and optionally sugars and shortening, in proportions normally used in conventional bread making. The ingredients are mixed in a standard batch dough mixer for about 5 to 8 minutes and the dough batch so formed is transferred to a container for a bulk fermentation period of about 30 to 60 minutes.

The dough then is divided into five to seven pound portions and placed in rectangular wooden containers in which the longer dimension is vertical and approximately 18 inches with the horizontal surface being about 6 inches × 10 inches in cross section. The two larger vertical faces of the container are covered with sheet metal, which acts as an electrical conductor.

The dough is allowed to proof in the containers for an hour, during which period the dough expands vertically. Baking is effected by passing an electrical current through the proofed dough for about 12 minutes, which further elongates the dough by expansion of the yeast-formed gas cells and formation of water vapour in the porous dough. The cooked dough is removed from the containers after a brief cooling period and allowed to fully cool, evaporate and stale overnight. The bread is then ground to the required mesh size and dried to the desired final moisture content.

SUMMARY OF INVENTION

The present invention is concerned with an improved process for the formation of oriental-style breading crumbs which is continuous in nature, involves considerably shorter time periods and greatly reduced space and labour requirements than the prior art, and is more versatile than the prior art with respect to the form of the product which is produced.

In accordance with the present invention, a leavened dough first is formed from bread forming ingredients, a tow is formed from the dough, the tow is stretched to effect elongation of the pores within the leavened dough, the stretched dough is baked while maintaining the dough in its stretched form, the baked dough is comminuted to form the breading particles, and the comminuted particles are dried to the desired moisture level.

GENERAL DESCRIPTION OF INVENTION

The initial bread-forming ingredients used in the process of the invention may comprise any of the components conventionally used in bread-making and itemized under the Standards of Identity, FDA Regulations 21 C.F.R. 136.110 to 0.180 inclusive. The basic components of any dough are flour and water, the term "flour" including farinaceous flours used alone or in combination with other flours and meals, such as, the permitted materials outlined in 21 C.F.R. 137.105 to 0.350 inclusive, as well as those of legumes, rye, sorghum and rice. Usually the flour used comprises a major proportion of hard wheat flour.

Varying amounts of dough-forming components may be used, usually including sugar, salt and vegetable shortening in varying proportions, depending on the characteristics desired in the product and the flour used. Other bread-forming components which may be used include oxidizing, maturing and improving agents, such as, potassium bromate, azodicarbonamide, cysteine hydrochloride and ascorbic acid. Yeast, and amylolytic and proteolytic enzymes also may be included, to modify texture and flavour in the product. Emulsifiers and cell-wall improvers may be used.

Leavening of the dough may be effected in this invention utilizing any convenient leavening agent. It is preferred to effect the leavening using gaseous materials, such as, carbon dioxide, nitrogen, air, or mixtures of gases, alone or in combination with chemical leavening using leavening gas-producing chemicals. Such leavening gas-producing chemicals include a combination of sodium bicarbonate and sodium aluminum phosphate or a combination of sodium bicarbonate and monocalcium phosphate.

Yeast leavening may be used but is less preferred since longer holding times are required, thereby increasing equipment space requirements, and a lesser quality of product is obtained. The presence of more than small quantities of salt tends to inhibit the leavening effect of yeast. Where leavening is effected using gaseous materials, more than the usual small quantities of salt may be used, enabling variations in flavour to be achieved.

Further, where leavening is effected using gaseous materials, alone or in combination with chemical leavening, as in the preferred embodiment of the invention, yeast, however, may be used as a flavour enhancer in the dough.

The various proportions of dough-forming ingredients used to form the dough depend on the properties desired, the flour used and also on the nature and choice of components. One suitable composition of ingredients, exclusive of water, which may be utilized in this invention, as a dry mix, includes:

| | |
|---|---|
| Hard wheat flour | 100 parts by weight |
| Sugar | up to about 5% by weight of flour |
| Salt | up to about 5% by weight of flour |
| Vegetable shortening | up to about 8% by weight of flour |

In addition, one or more of the following optional components may be present, based on the weight of flour:

| | |
|---|---|
| Yeast | 0 to about 4% by weight |
| Yeast food | about 0.2 to about 0.35% by weight when yeast is present |
| Corn sugar | 0 to about 1.0% by weight |
| Mono and/or diglycerides | 0 to about 0.5% by weight |
| "Tween" surfactant | 0 to about 1.0% by weight |

Another suitable composition of ingredients also useful as a dry mix in this invention, utilizing a mixture of flours, may comprise:

| | |
|---|---|
| Hard wheat flour | about 67 parts by weight |
| Soft wheat flour | about 33 parts by weight |
| Sugar | up to about 5% by weight of flour |
| Vegetable shortening | up to about 8% by weight of flour |
| Salt | up to about 5% by weight of flour |

In addition, one or more of the following optional components may be present in the latter dry mix, based on the weight of flour:

| | |
|---|---|
| Yeast | 0 to about 4% by weight |
| Yeast food | about 0.2 to about 0.35% by weight when yeast is present |
| Protease | about 10,000 to 50,000 H.U. hemoglobin units)/100 lbs of flour |
| Amylase | about 2000 to about 8000 SKB units) Standstedt, Keen, and Blish)/100 lbs of flour |
| Mono and/or diglycerides | 0 to about 0.5% by weight |
| "Tween" surfactant | 0 to about 1.0% by weight |
| Corn sugar | 0 to about 1.0% by weight |

Products made from the preceding compositions, while useful in certain end uses, are somewhat inferior, in that they lack fry tolerance, lack flavour, have inferior structure and tend to have a dark appearance.

In a preferred embodiment of this invention, flavour-enhancing and texture-modifying premixes or brews are used to improve texture, flavour, fry tolerance and structure of the product and to provide a wide variety of properties. One or more of these properties may be improved over the corresponding property of the oriental-style crumb produced by conventional procedures.

The flavour-enhancing and texture-modifying premixes include enzyme systems which are used in a concentrated brew along with a minor proportion, usually less than about 20% by weight, of the total proportion of flour used and a major proportion, usually about 50 to 80% by weight, of the inlet moisture. The brew is fermented for a short period of time, typically about 30 minutes at about 90° to 105° F., during which time the amylases and proteases have sufficient time to modify the flour and provide a desired texture and other properties in the final product.

A brew mix which may be used in this way contains, based on total flour in the overall dough-forming composition:

| | |
|---|---|
| Hard wheat flour | about 5 to about 20% by weight |
| Water | about 35 to about 55% by weight |
| Proteolytic enzyme | about 25,000 to about 85,000 H.U. per 100 lb of flour |
| Amylolytic enzyme | about 1250 to about 8000 SKB units per 100 lb of flour |

The above-described brew mix, after completion of the fermenting period, is used in this embodiment of the invention in association with such additional water as may be required to provide the desired overall moisture content and with a dry mix comprising, by weight of total flour in the overall dough-forming composition:

| | |
|---|---|
| Hard wheat flour | about 80 to about 95% by weight |
| Vegetable shortening | up to about 8% by weight |
| Chemical leavening agents | up to about 4% by weight |
| Sugar | up to about 5% by weight |
| Salt | up to about 5% by weight |

This dry mix may also contain optional ingredients, based on total flour in the overall dough-forming composition, namely:

| | |
|---|---|
| Mono and/or diglycerides | 0 to about 0.5% by weight |
| Tween surfactant | 0 to about 1.0% by weight |
| Corn sugar | 0 to about 1.0% by weight |

The dough-forming ingredients are mixed together to form a dough. In a preferred embodiment of the process of this invention, the dough-forming ingredients are fed to inlets at one end of a continuous mixing zone capable of plug flow therethrough. The mixing zone may taken the form of an elongate screw-type mixer-extruder, suitably modified to provide the required processing conditions therein. The dough-forming components are fed to one end of the mixer in relative proportions suitable to provide an overall moisture content of intermixed components of about 38 to about 50% by weight, preferably about 42 to about 47% by weight. The dry mix, water, and any flavour-enhancing and texture modifying ferment, are usually separately fed to the mixer.

Within the mixing zone, the dough-forming ingredients are continuously intermixed while they are conveyed from one end of the mixing zone to the other, over a period of time about 20 to about 120 seconds, preferably about 30 to about 60 seconds.

A plurality of spaced gaseous inlets is provided along the length of the mixing zone and a gaseous leavening material, or mixture of such gaseous materials, is injected into the mix through the openings. Carbon dioxide usually is used as the gaseous leavening material, often in admixture with nitrogen, although other gaseous leavening materials may be used, including air and oxygen. The total gas feed to the mixing zone is in the range of about 1.0 to about 10 SCF, preferably about 2 to about 4 SCF, per 100 lb of dough.

The carbon dioxide, or other gaseous material, may be used as the sole leavening agent, although it is usually preferred in the continuous process mode of the invention to employ chemical leavening agents in addition to the carbon dioxide. When such chemical leavening agents are present, the carbon dioxide tends to stabilize the pore structure.

The dough-forming components and the injected gas, as well as in-situ produced gas when the chemical leavening agents are used, are subjected to high shear forces within the mixing zone, sufficient to cause simultaneous uniform mixing of the components and dispersion of the gases throughout the mix. The work done on the dough within the mixing zone varies from about 4 to about 16 watt hr/lb of dough, preferably about 8 to about 12 watt hr/lb.

The mix of dough-forming components and inert gas usually is heated within the mixing zone for at least a major proportion, typically about 75%, of the length of the mixing zone to cause partial swelling of starch granules contained in the dough-forming components.

The temperature in the mixing zone is maintained sufficiently high that the heat applied, combined with that resulting from the high shear mixing, results in a dough emerging from the mixing zone having a temperature of about 85° to about 120° F., preferably about 95° to about 105° F.

The dough resulting from the operations in the continuous mixing zone is extruded therefrom under a back pressure which is usually in the range of about 50 to about 500 psig, and is preferably a relatively low back pressure in the range of about 75 to about 120 psig, achieved by suitable design of the extrusion nozzle. The mixing operations effected in the mixing zone are controlled by the above-described parameters to result in an extruded dough having a viscosity comparable to that achieved from a conventional batch dough-forming procedure.

The dough formed by the above-described continuous mixing procedure is extruded from the mixing zone as a continuous tow, which generally has a transverse dimension of about 2 to about 6 inches.

The extruded dough tow is allowed to "relax" for a time period sufficient to achieve an extensible dough. Where leavening is effected using gaseous leavening agents, preferably also with chemical leavening agents, this relaxation time usually is about 1 to about 7 minutes, typically about 2 minutes. Where, however, leavening is achieved using yeast, a longer relaxation period is required followed by a proofing period. The stretching of the extruded dough tow may be effected in a batch manner or, more preferably, in a continuous manner.

In the batch procedure, the tow is cut into convenient lengths, usually about 6 to about 12 inches, and the individual lengths are longitudinally stretched, usually to about 3 to about 8 times their original length, to effect elongation of the pores within the dough. The degree of stretching of the tow lengths is critical to the invention, in that if the stretching is insufficient, then splintering of baked dough to form the Oriental-style crumbs does not occur, while if the stretching is too great, then the tow lengths break and the porous structure collapses.

This batch procedure is somewhat disadvantageous in that it is difficult to control the degree of stretch and hence the consistency of finished product, and loaves result which leave ends which are not splintered and represent waste. For these reasons, it is preferred to utilize a continuous procedure, which produces a consistent product and no unstretched portions are found in loaf ends.

In the continuous procedure, the dough tow is maintained as a continuous length and is stretched over a series of moving belts of successively increasing conveyor speed to effect a stretch of usually about 3 to about 8 times over a period of usually about 30 seconds to about 6 minutes. The relative surface speeds of the belts depend on the degree of stretch required, the rate of production of the dough from the mixing zone and the throughput of dough required.

For example, for a dough tow stretch of 5 times and using 5 conveyors, the initial belt speed may vary from about 1.25 to about 16 ft/min, typically about 2.5 ft/min, increasing uniformly to a final belt speed of about 6.25 to about 80 ft/min, typically about 12.5 ft/min. At such a final belt speed, a typical dough throughput is about 200 to about 3000 lb/hr.

The dimensions of the stretched tow which results from this stretching operation depend on the initial dimensions and the degree of stretching which is effected. Usually, the stretched tow is about 1 to about 5 inches wide and about ½ to about 1½ inches thick.

The stretched dough next is baked. The baking of the stretched tow may be effected in any desired manner, including infrared baking, microwave baking and a combination of the two. When infrared baking is employed, either alone or in combination with microwave baking, the bread tow must be in a twisted form to maintain the desired porous structure during dough baking and to enable splintering of the baked tow to be effected.

Twisting of the dough prior to baking may be effected on a continuous tow, if such is formed in the continuous process discussed above. Alternatively, where the batch process is used, the stretched pieces are twisted together in pairs or greater numbers. The number of twists effected depends, to some extent, on the length of the individual tow pieces, and usually is about 4 to about 10 times. Such twisting preferably is effected after initial stretching, although the process is effective if the twisting is carried out prior to stretching.

Where microwave baking alone is used, the baking may be effected on a continuous stretched tow without twisting and hence is preferred.

When the baking is effected wholly in an infra-red baking oven, the oven temperature may vary from about 325° to about 400° F. to result in an internal temperature of baked dough of about 175° to about 210° F. The bake time required is usually about 25 to about 40 minutes.

When the baking is effected by a combination of microwave baking followed by infrared baking, the microwave baking operation is effected at a microwave energy input of about 1.0 to about 2.0 KWH/100 lb of dough for a time sufficient to result in an internal temperature of about 125° to about 175° F., usually about 60 to about 180 seconds. During the microwave baking, an air flow is maintained to remove moisture evaporated in the baking process. Dough passes through the microwave oven at a throughput rate of about 50 to about 200 lb of dough per hour.

Following completion of the microwave baking step, the partially-baked dough is subjected to infra-red oven baking to complete the baking step. The oven baking may be effected at a temperature in the range of about 325° F. to about 400° F. for a time sufficient to result in a dough temperature of about 175° to about 210° F., preferably about 190° F., generally in about 10 to about 25 minutes.

In effecting wholly microwave baking on stretched dough, the conveyor belt of the oven is run faster than the rate of feed of the tow, so as to maintain the tension in the elongate direction of the tow and thereby maintain the elongation of the pores during gas expansion induced by the baking. The differential in speed is such that the conveyor belt of the microwave oven moves at about 5 to about 20% faster than the feed rate.

Preferably, when this procedure is adopted, chemical leavening agents are used in the dough-forming components, such chemical leavening agents being chosen to have residual leavening activity during the microwave baking operation, so as to counteract the compression applied to the pores by the stretching step.

The microwave energy input is about 1.7 to about 3.7 KWH/100 lb of dough for a time to result in an internal temperature of preferably about 175° F. to about 210° F., usually in about 10 to about 300 seconds. The microwave initially sets the structure of the stretched tow and then bakes the dough to a fully baked state.

During the microwave baking, an air flow is maintained to remove moisture evaporated in the baking process. Moisture loss during the microwave baking varies from about 3% to about 12% by weight. Such moisture removal is necessary in order to reach the desired internal temperature of the fully cooked product.

Following completion of the baking of the dough, the loaves are allowed to stand for a period of time to permit the loaves to cool. The cooling may be effected, for microwave-baked loaves, for about 6 minutes to about 4 hours and for oven-baked loaves, for about 1 to about 24 hours, usually by standing on perforated racks.

As the tow emerges baked from the oven, it lacks the mechanical strength to be shredded or ground without compaction. The short cooling period permits the bread to become more rigid and hence able to undergo shredding or grinding.

The cooling period which is used in the preferred embodiment of the invention contrasts markedly with the procedure required when the conventional procedure is used, in that the prior art requires a long staling period, typically about 18 hours, before the bread becomes rigid enough for grinding. In contrast, the rapid process used in this invention does not give rise to the formation of antistaling components and hence the baked dough rapidly achieves a staled condition sufficient to permit shredding to a splinter shape only a short time after completion of baking.

The cooled loaves next are ground to cause comminution of the loaves and formation of Oriental-style breading crumbs. The dried breading crumbs formed in this way have an elongate splinter shape, characteristic of Oriental-style breading crumbs. The crumbs are dried to a moisture level below about 12 wt.%, preferably about 3 to about 7 wt.%.

The properties of the product which results from the process of the invention may approximate those of the product produced by the conventional process. However, by varying the ingredients and processing conditions, the crumbs may have less fragility and a significantly improved shelf life when compared with the prior art, and may have a variable browning rate and/or a variable texture.

EXAMPLES

EXAMPLE 1

This Example illustrates the preparation of Oriental-style breading crumbs wherein baking is effected using partially microwave baking and partially infrared baking.

Two separate compositions were prepared, namely a dry mix and a liquid brew. The compositions had the following constituents:

| Component | % by weight |
|---|---|
| (a) Dry Mix: | |
| Hard Wheat Flour | 95.3 |
| Vegetable shortening | 2.1 |
| Salt | 1.6 |
| Sugar | 1.0 |
| (b) Liquid Brew | |
| Yeast food | 0.5 |
| Corn sugar | 2.3 |
| Flour | 20.2 |
| Yeast (bulk granular) | 7.7 |
| Water | 69.3 |
| Protease | 40,500 H.U |
| Amylase | 8,300 SKB units |

The liquid brew was activated 30 minutes prior to commencement of the procedure.

The dry mix, liquid brew and additional water were fed to one end of an extruder at the following feed rates:

| Dry mix | 15 lb/min |
|---|---|
| Liquid brew | 10.3 lb/min |
| Water | 2.5 lb/min | which corresponds to an inlet moisture content of 45% by weight.

The components were continuously intermixed during passage from one end of the extruder to the other over a period of about 35 seconds. Carbon dioxide was fed into the extruder at six different locations along the length of the extruder at a rate of 3.4 SCF/100 lb dough while the extruder was heated to result in a dough having a temperature of 110° F. at the exit of the extruder. Work was applied to the dough during formation thereof and passage through the extruder of 10 watt hr/lb of dough and a back pressure of 110 psig existed at the extruder outlet orifice.

A continuous dough tow of about 3 inches in diameter was extruded from the extruder and cut into 9 inch length loaves (about 1 lb). These loaves were stretched to about 5 times their original length. Two pieces were placed side by side, twisted together about 7 times and then baked. The baking was effected using a successive combination of microwave and infrared heating.

The microwave baking was effected to set the dough and maintain the desired pore structure at an energy input of 1.6 KWH/100 lb dough while a flow of air at a temperature of about 250° F. was passed through the oven to remove the moisture. The microwave baking was effected to result in an internal temperature of the dough of 150° F.

The infrared baking of the microwave-baked dough was effected at an oven temperature of about 350° F. for 15 minutes to result in an internal temperature of the baked dough of 190° F.

The loaves were then cooled for about 60 minutes, ground to the desired particle size and dried to a moisture content of about 5% by weight. The resulting crumbs had the characteristic shape of the Oriental-style breading crumb and had the following properties:

| Screen Analysis - mesh | +5 | +8 | +14 | +20 | −20 |
|---|---|---|---|---|---|
| % retained | 0 | 50 | 30 | 15 | 5 |
| Bulk density | 16.2 lb/ft³ | | | | |

EXAMPLE 2

The procedure of Example 1 was repeated using the following dry mix and liquid brew:

| Component | % by weight |
|---|---|
| (a) Dry Mix | |
| Hard wheat flour | 63.0 |
| Soft wheat flour | 31.5 |
| Vegetable shortening | 3.8 |
| Myvaplex 600* | 0.8 |
| Sugar | 0.9 |

*Myvaplex 600 is a concentrated glyceryl monostearate manufactured by Eastman Chemical Products

| | |
|---|---|
| (b) Liquid brew | |
| Water | 70.0 |
| Sugar | 1.9 |
| Wytase* | 0.8 |
| Soft wheat flour | 6.5 |
| Hard wheat flour | 12.1 |
| Yeast (bulk granular) | 7.8 |
| Yeast food | 0.9 |
| Protease | 25,000 H.U. |
| Amylase | 5,400 SKB units |

*Wytase is an enzyme active soy flour manufactured by Short Milling.

The liquid brew was activated 30 minutes prior to start up.

The dry mix, liquid brew and additional water were fed to one end of the extruder at the following feed rates:

| Dry mix | 15.0 lb/min |
|---|---|
| Liquid brew | 11.0 lb/min |
| Water | 1.0 lb/min | corresponding to an inlet moisture content of about 45% by weight.

The operating conditions of the extruder were as follows:

| Mixing time | about 35 seconds |
|---|---|
| Gas inlet flow | 3.1 SCF/100 lb dough |
| Work applied | 11 watt hr/lb of dough |
| Extruder back pressure | 110 psi |
| Dough exit temperature | 115° F. |

The product, which had the characteristic appearance of Oriental-style breading crumbs, possessed the following properties

| Screen Analysis - mesh | +5 | +8 | +14 | +20 | −20 |
|---|---|---|---|---|---|
| % retained | 0 | 50 | 30 | 15 | 5 |
| Bulk Density | 17.4 lb/ft³ | | | | |

EXAMPLE 3

This Example illustrates the preparation of Oriental-style breading crumbs wherein baking is effected wholly by infrared baking.

The extruder operation of Example 1 was again repeated using the following dry mix and liquid brew:

| Component | % by weight |
|---|---|
| (a) Dry Mix | |
| Hard wheat flour | 93.9 |
| Vegetable shortening | 3.7 |
| Salt | 1.6 |
| Myvaplex 600 | 0.8 |
| (b) Liquid brew | |
| Water | 66.5 |
| Hard wheat flour | 25.7 |
| Yeast food | 1.2 |
| Yeast (bulk granular) | 4.1 |
| Sugar | 2.5 |
| Protease | 33,000 H.U. |
| Amylase | 7,100 SKB units |

The liquid brew was activated 60 minutes before start up.

The dry mix, liquid brew and additional water were fed to one end of the extruder at the following feed rates:

| Dry Mix | 16.6 lb/min |
|---|---|
| Liquid brew | 10.3 lb/min |
| Water | 3.2 lb/min |

After stretching the dough tow loaves to about 4 times their original length and twisting pairs of lengths together, the twisted-together pairs were baked in an infrared baking ovens at an oven temperature of about 350° F. for about 30 minutes to result in an internal temperature of 200° F.

After cooling, grinding and drying to a moisture content of 3.6% by weight, the resulting crumbs had the characteristic shape of the Oriental-style breading crumb and had the following properties:

| Screen analysis - mesh | +4 | +5 | +8 | +14 | +20 | −20 |
|---|---|---|---|---|---|---|
| % retained | trace | 12 | 32 | 25 | 17 | 13 |
| Bulk density | 13.2 lb/ft³ | | | | | |

EXAMPLE 4

This Example illustrates a completely continuous process for the preparation of Oriental-style breading crumbs which uses microwave baking of stretched tow.

The extruder operation of Example 1 was repeated, using the following dry mix and liquid brew:

| Component | % by weight |
|---|---|
| (a) Dry mix | |
| Hard wheat flour | 90.2 |
| Vegetable shortening | 3.6 |
| Sodium bicarbonate | 1.8 |
| Sodium aluminum phosphate | 1.8 |
| Sugar | 1.4 |
| Salt | 1.2 |
| (b) Liquid brew | |
| Water | 72.0 |
| Hard wheat flour | 28.0 |
| Protease | 33,600 H.U. |
| Amylase | 7,300 SKB units |

The liquid brew was activated 30 minutes before start up.

The dry mix, liquid brew and additional water were fed to one end of the extruder at the following feed rates:

| | |
|---|---|
| Dry mix | 15.0 lb/min |
| Liquid brew | 10.0 lb/min |
| Water | 3.5 lb/min | corresponding to a moisture content of 46% by weight. The following operating conditions were used:

| | |
|---|---|
| Mixing time | about 35 seconds |
| Gas inlet flow | 2.4 SCF/100 lb dough |
| Work applied | 9 watt hr/lb dough |
| Extruder back pressure | 120 psi |
| Dough exit temperature | 100° F. |

A continuous dough tow of about 3 inches in diameter was extruded and conveyed along a cloth belt in 2 minutes to a stretching apparatus comprising a plurality of continuous conveyor belts which move at successively increasing speeds. The continuous tow was stretched to about 5.5 times its original length on the stretching conveyors over a period of about 3 minutes and then was passed into a tunnel microwave oven through which the stretched tow was conveyed on a belt.

The belt of the oven moved at a speed about 10% faster than that of the last conveyor of the stretching apparatus to maintain the elongated structure of the pores in the dough. The dough was baked in the microwave oven at an energy input of 2.7 KWH/100 lb of dough while an air flow was passed through the oven to remove moisture. The microwave cooking was effected to result in a moisture loss from the dough of about 6% by weight and an internal temperature at the oven exit of about 185° F.

As the tow exited the microwave oven, the tow was cut into lengths of about 24 inches and cooled for about 15 minutes. The pieces were then ground in a Mikawa mill Model 18RT37 and the resulting crumbs were dried to a moisture content of about 8% by weight.

The resulting crumbs had the characteristic appearance of Oriental-style breading crumbs and possessed the following properties:

| Screen analysis - mesh | +5 | +8 | +14 | +20 | −20 |
|---|---|---|---|---|---|
| % retained | 0 | 50 | 30 | 15 | 5 |
| Bulk density | 14.5 lb/ft³ | | | | |

EXAMPLE 5

The procedure of Example 4 was repeated, except that the dry mix comprised:

| Component | % by weight |
|---|---|
| Hard Wheat flour | 91.0 |
| Vegetable Shortening | 3.6 |
| Sodium bicarbonate | 1.4 |
| Sodium aluminum phosphate | 1.4 |
| Sugar | 0.9% |
| Atmul 500* | 0.5% |
| Salt | 1.2% |

*Atmul 500 is a mixture of mono- and di-glycerides manufactured by ICI America Inc.

and the brew mix comprised:

| Component | % by weight |
|---|---|
| Water | 72.0 |
| Hard Wheat Flour | 28.0 |
| Protease | 35,500 H.U. |
| Amylase | 7,700 SKB units |

The resulting crumbs had the characteristic appearance of Oriental-style breading crumbs and possessed the following properties:

| Screen Analysis - mesh | +5 | +8 | +14 | +20 | −20 |
|---|---|---|---|---|---|
| % retained | 0 | 35 | 40 | 10 | 15 |
| Bulk density | 12.5 lb/ft³ | | | | |

EXAMPLE 6

This Example illustrates the properties of the Oriental-style breading crumbs in use.

(a) Fry test

Samples of the products of Examples 4 and 5 were subjected to frying for 3½ minutes at 350° F. and the results compared with those obtained when frying samples of a commercially-available Oriental-style breading crumb.

The product of Example 4 and the commercial product were found to exhibit similar browning rates and to produce similar texture. The product of Example 4 exhibited a more pronounced splinter shape than the commercial product.

The product of Example 5 exhibited a higher browning rate and produced a more tender product than the product of Example 4, illustrating the variation in properties which may be attained by varying the dough-forming components.

(b) Breading test

Oriental-style breading crumbs produced by the procedure of Example 4 possessed the following properties:

| Screen analysis - mesh | +8 | +14 | +20 | −20 |
|---|---|---|---|---|
| % retained | 34 | 42 | 6 | 18 |
| Bulk density | 12.5 lb/ft³ | | | |
| Moisture content | 7.2 wt. % | | | |

These crumbs were circulated in a Stein Breading machine Model MB2B for 1 hour and the screen analysis repeated and compared with the screen analysis for a commercially-available Oriental-style breading crumb subjected to the same conditions. The results obtained are as follows:

| Screen analysis - mesh | +8 | +14 | +20 | −20 |
|---|---|---|---|---|
| % change* | | | | |
| Eg 4 | −69 | −5 | +72 | +118 |
| Commercial Product | −90 | −58 | +78 | +260 |

*(− is decrease and + is increase)

These results show that, although both products were degraded by the action of the breading machine, there was much less degradation and the formation of fines in the case of the product of Example 4.

SUMMARY OF DISCLOSURE

In summary of this disclosure, the present invention provides an improved method of forming Oriental-style breading crumbs which is capable of producing a superior product as compared with the prior art. Modifications are possible within the scope of this invention.

What we claim is:

1. A method of forming oriental-style breading crumbs, which comprises the sequential steps of:
    forming a leavened dough from bread-forming ingredients, including flour and water, and at least one leavening agent,
    forming a tow of the leavened dough,
    longitudinally stretching the dough tow to about 3 to about 8 times its initial length,
    baking the stretched dough while maintaining the dough in stretched form, and
    comminuting the baked dough to particulate form.

2. The method of claim 1 wherein said leavened dough is formed in continuous manner from the bread-forming ingredients and at least one leavening agent.

3. The method of claim 2 wherein said leavening is effected using at least one gaseous leavening agent fed to said bread-forming components.

4. The method of claim 2 wherein said leavening is effected using at least one gaseous leavening agent fed to said bread-forming ingredients and gaseous leavening produced by chemical leavening agents included with said bread-forming components.

5. The method of claim 1, 2, 3 or 4 wherein said baking is effected wholly by infrared baking, wholly by microwave baking or by a combination of microwave baking and infrared baking.

6. A method for the manufacture of Oriental-style breading crumbs, which comprises:
    feeding bread-forming components including flour and water to a continuous mixing zone in quantities such that the total quantity of moisture in the bread-forming components is about 38 to about 50% by weight,
    advancing the bread-forming components in plug flow manner through said mixing zone in about 20 to about 120 seconds,
    introducing at least one inert leavening gas to said bread-forming components at a plurality of locations during the passage of said components through said zone at a gas flow rate of about 1 to about 10 SCF per 100 lbs of bread-forming components,
    subjecting said bread-forming components, introduced inert leavening gas and any in-situ produced leavening gas to conditions of high shear within said mixing zone such that the work done on the materials within said mixing zone is from about 4 to about 16 watt hr/lb of bread-forming components to cause mixing of said components and distribution of said leavening gas within the bread-forming components,
    subjecting said bread-forming components and leavening gas to a back pressure of about 50 to about 500 psig within said mixing zone,
    extruding a leavened dough from said continuous mixing zone as a longitudinal tow,
    allowing said leavened dough to relax for about 1 to about 7 minutes,
    stretching said dough tow longitudinally thereof by about 3 to about 8 times,
    baking said stretched dough while maintaining said dough in said stretched condition to result in a baked dough of internal temperature of about 175° to about 210° F.,
    cooling said baked dough, and
    comminuting and drying the cooled and baked dough to Oriental-style breading crumbs having a moisture content of less than about 12 wt.%.

7. The method of claim 6 wherein said bread-forming components include chemical leavening agents which react together to form dough leavening gas, whereby said dough contains in-situ produced leavening gas in addition to said inert leavening gas.

8. The method of claim 6 wherein said bread-forming components include a dry mix comprising:

| Hard wheat flour | 100 parts by weight |
| --- | --- |
| Sugar | up to about 5% by weight of flour |
| Salt | up to about 5% by weight of flour |
| Vegetable shortening | up to about 8% by weight of flour |
| Yeast | 0 to about 4% by weight of flour |
| Yeast food | about 0.2 to about 0.35% by weight of flour when yeast is present |
| Corn sugar | 0 to about 1.0% by weight of flour |
| Mono and/or diglycerides | to about 0.5% by weight of flour |
| Surfactant | 0 to about 1.0% by weight of flour |

9. The method of claim 6 wherein said bread-forming components include a dry mix comprising:

| Hard wheat flour | about 67 parts by weight |
| --- | --- |
| Soft wheat flour | about 33 parts by weight |
| Sugar | up to about 5% by weight of flour |
| Vegetable shortening | up to about 8% by weight of flour |
| Salt | up to about 5% by weight of flour |
| Yeast | 1 to about 4% by weight of flour |
| Yeast food | about 0.2 to about 0.35% by weight when yeast is present |
| Corn sugar | 0 to about 1.0% by weight of flour |
| Mono and/or diglycerides | 0 to about 0.5% by weight of flour |

10. The method of claim 9 wherein said dry mix also contains:

| Protease | about 10,000 to about 50,000 H.U./100 lbs of flour. |
| --- | --- |
| Amylase | about 2000 to about 8000 SKB units/100 lbs of flour |

11. The method of claim 6 wherein said bread-forming components include a flavour-enhancing and texture-modifying brew mix which is fermented for a short period of time prior to mixing with the other bread-forming components.

12. The method of claim 11 wherein said brew mix comprises, based on the total weight of flour in the bread-forming components,

| Flour | about 5 to about 20% by weight |
|---|---|
| Water | about 35 to about 55% by weight |
| Proteolytic enzyme | about 25,000 to about 85,000 H.U. per 100 lbs of flour |
| Amylolytic enzyme | about 1250 to about 8000 SKB units per 100 lbs of flour |

13. The method of claim 12 wherein the fermented brew mix is mixed, to form the bread-forming components with such additional water as is required to provide the desired overall moisture content and a dry mix comprising, based on the total weight of flour in the bread-forming components:

| Flour | about 80 to about 95% by weight |
|---|---|
| Vegetable shortening | up to about 8% by weight |
| Chemical leavening agents | up to about 4% by weight |
| Sugar | up to about 5% by weight |
| Salt | up to about 5% by weight |
| Corn sugar | 0 to about 1.0% by weight |
| Mono and/or diglycerides | 0 to about 0.5% by weight |
| Surfactant | 0 to about 1.0% by weight |

14. The method of claim 12 or 13 wherein said flour is hard wheat flour.

15. The method of claim 12 or 13 wherein said brew mix, dry mix and additional water are fed to the mixing zone to produce a moisture content of about 42 to about 47% by weight in said bread-forming components.

16. The method of claim 15 wherein said time within said mixing zone is about 30 to about 60 seconds, said gas feed rate is about 2 to about 4 SCF of carbon dioxide per 100 lb of dough, the work done on the dough is about 8 to about 12 watt hr/lb, and the back pressure is about 75 to about 120 psig.

17. The method of claim 16 wherein said mixing zone is heated for a major proportion of the length thereof to result in a leavened dough extruded from the mixing zone having a temperature of about 95° to about 105° F.

18. The method of claim 6 wherein said mixing zone is heated for a major proportion of the length thereof to such an extent that the dough extruded from the mixing zone has a temperature of about 85° to about 120° F.

19. The method of claim 6 wherein said dough tow, following said relaxing step, is cut into lengths of about 6 to about 12 inches, each such length is subjected to said stretching step, pairs of said stretched tow lengths are twisted together about 4 to about 10 times, and the twisted together lengths of tow are subjected to said baking step, whereby said twistings serve to maintain said stretched condition during said baking step.

20. The method of claim 19 wherein said baking step is effected in an infrared heat oven at an oven temperature of about 325° to about 400° F. for about 25 to about 40 minutes.

21. The method of claim 19 wherein said baking step is effected in two steps in which, in the first step, an initial baking is effected using microwave eneergy at an applied energy level of about 1.0 to about 2.0 KWH/100 lb of dough for about 60 to about 180 seconds to raise the internal temperature of the dough from about 125° to about 175° F., and, in the second step, a final baking is effected using infrared energy in an infrared oven having an oven temperature of about 325° to about 400° F. for about 10 to about 25 minutes to raise the internal temperature of the dough to about 175° to about 210° F.

22. The method of claim 3 or 4 wherein said cooling step is effected for about 60 to about 180 minutes.

23. The method of claim 6 wherein said stretching step is effected on a continuous dough tow by conveying the continuous tow on a plurality of longitudinally-extending moving surfaces which move at successively increasing surface speed sufficient to effect said stretching.

24. The method of claim 23 wherein the first of said moving surfaces has a belt speed of about 1.25 to about 16 ft/min and the last of said moving surfaces has a belt speed of about 6.25 to about 80 ft/min.

25. The method of claim 23 wherein said baking step is effected using microwave energy applied at an applied energy level of about 1.7 to about 3.7 KWH/100 lb of dough for about 30 to about 180 seconds to achieve said internal temperature while the stretched tow is conveyed at a speed of about 5 to about 20% faster than the speed of the last of said plurality of moving surfaces, whereby said stretched dough tow is maintained in said stretched condition.

26. The method of claim 25 wherein said dough loses about 3 to about 12% by weight of moisture during said microwave baking.

27. The method of claim 25 wherein said cooling step is effected for about 6 to about 60 minutes.

28. A continuous method for the manufacture of Oriental-style breading crumbs, which comprises:
feeding a dry mix, a liquid brew and water to one end of a continuous mixing zone in quantities such that the total moisture content in the continuous mixing zone is about 42 to about 47% by weight,
said dry mix comprising, based on the total weight of flour in the dry mix and liquid brew:

| Hard wheat flour | about 80 to about 95% by weight |
|---|---|
| Vegetable shortening | up to about 8% by weight |
| Chemical leavening agents | up to about 4% by weight |
| Sugar | up to about 5% by weight |
| Salt | up to about 5% by weight |
| Corn sugar | 0 to about 1.0% by weight |
| Mono and/or diglycerides | 0 to about 0.5% by weight |
| Surfactant | 0 to about 1.0% by weight, | said liquid brew being a flavour-enhancing and texture-modifying brew mix which is fermented for a short period of time prior to feeding to the mixing zone and comprising, based on the total weight of flour in the dry mix and liquid brew:

| Hard wheat flour | about 5 to about 20% by weight |
|---|---|
| Water | about 35 to about 55% by weight |
| Proteolytic enzyme | about 25,000 to about 85,000 H.U./100 lb of flour |
| Amylolytic enzyme | about 1250 to about 8000 |

-continued

SKB units/100 lb of flour;

advancing the resulting mixture of bread-forming components in plug flow manner through the said mixing zone in about 30 to about 60 seconds;

introducing at least one inert leavening gas comprising carbon dioxide to said bread-forming components at a plurality of locations during the passage of said bread-forming components through said mixing zone at a gas flow rate of about 2 to about 4 SCF per 100 lb of bread-forming components;

subjecting said bread-forming components, introduced inert leavening gas and in-situ produced leavening gas from said chemical leavening agents to conditions of high shear within said mixing zone such that the work done on the materials within said mixing zone is about 8 to about 12 watt hr/lb of bread-forming components to cause mixing of said components and distribution of leavening gas within the bread-forming components;

heating said mixing zone for at least a substantial proportion of the length thereof such that such heat combined with that produced by high shear mixing results in a dough emerging from said mixing zone having a temperature of about 95° to about 105° F. to cause, partial swelling of starch granules present in said bread-forming components;

subjecting said bread-forming components and leavening gas to a back pressure of about 75 to about 120 psig within said mixing zone;

extruding a leavened dough from said continuous mixing zone as a longitudinal tow having a transverse dimension of about 2 to about 6 inches;

conveying said tow on a generally horizontal conveying surface for about 1 to about 7 minutes to permit said dough tow to relax;

conveying said relaxed tow on a plurality of generally horizontal conveying surfaces which move at successively higher conveying surface speeds from an initial conveying surface speed of about 1.25 to about 16 ft/min increasing uniformly to a final conveying surface speed of about 6.25 to about 80 ft/min, to effect stretching of the dough tow to about 3 to about 8 times its initial length in a period of about 30 seconds to about 6 minutes;

conveying the stretched dough tow through a microwave baking zone on generally horizontal conveying surface at a speed of about 5 to about 20% faster than the conveying surface speed of said final one of said plurality of conveying surfaces to maintain the stretched condition of said dough tow, subjecting said stretched dough tow to microwave baking in said microwave baking zone at an applied energy level of about 1.7 to about 3.7 KWH/100 lb of dough for about 10 to about 300 seconds to result in an internal dough tow temperature of about 175° to about 200° F., while the moisture content of dough tow decreases by from about 3 to about 12% by weight;

conveying said microwave-baked dough to a standing zone wherein said baked tow is permitted to cool and stand for about 6 minutes to about 4 hours; and comminuting and drying the cooled-baked dough to Oriental-style breading crumbs having a moisture content of less than about 12 wt.%.

29. The method of claim 28 wherein said brew fermentation is effected for about 30 minutes at about 90° to about 105° F.

30. The method of claim 28 or 29 wherein said chemical leavening agents comprise a mixture of sodium bicarbonate and sodium aluminum phosphate.

* * * * *